Oct. 19, 1937.     A. SCHREM     2,096,345
STRIPPING PRESS
Filed March 11, 1936     2 Sheets-Sheet 2

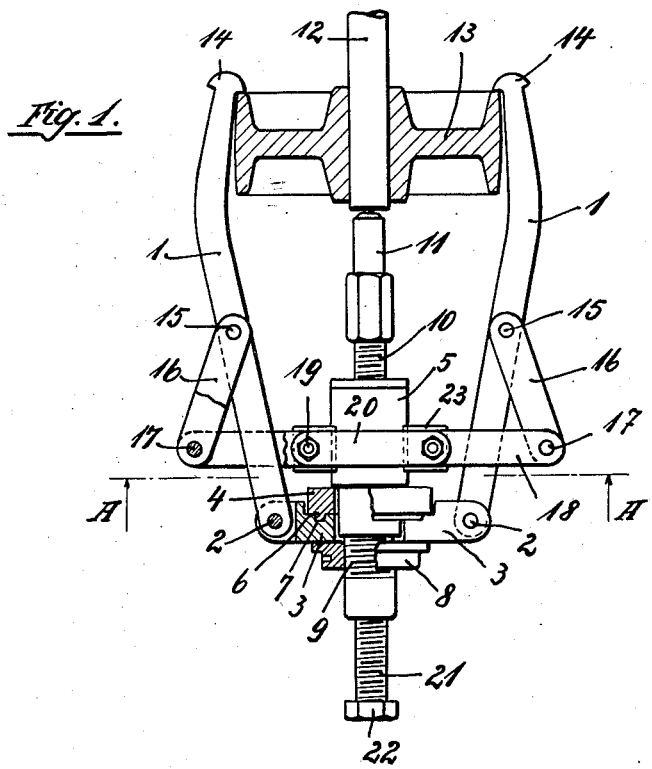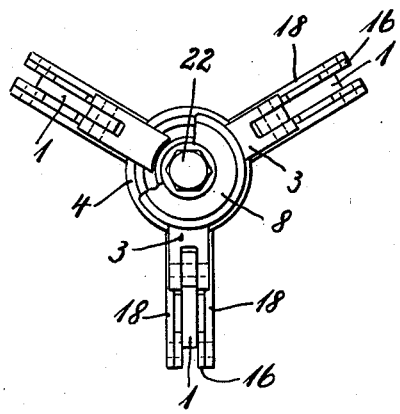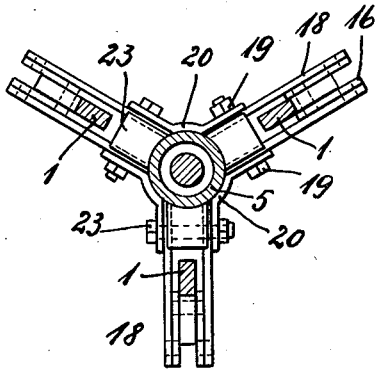

Inventor
Albert Schrem

Patented Oct. 19, 1937

2,096,345

UNITED STATES PATENT OFFICE 2,096,345

STRIPPING PRESS

Albert Schrem, Giengen (Brenz), Wurttemberg, Germany

Application March 11, 1936, Serial No. 68,218
In Germany March 7, 1935

1 Claim. (Cl. 29—85)

My invention relates to stripping presses, i. e., to devices serving for stripping sheaves, ball-bearings, fly-wheels, sleeves, etc., from the shafts on which they are mounted. It has particular reference to that kind of stripping devices which comprise a press, for instance an hydraulic press, which grips the part to be stripped with gripper arms pivoted to an axially displaceable pressure plate.

It is an object of my invention to provide a device of the kind aforesaid, in which the distance between the ends of the gripper arms can be varied within wide limits, thereby being adaptable to the diameter of the part to be gripped, the gripper arms being connected by way of a pair of levers or links for each arm with a sleeve slidable along a central cylindrical or prismatic guide, the axial displacement of this sleeve acting towards spreading or approaching the gripper arms as desired. I thus facilitate the displacement of the gripper arms in an altogether uniform manner by a simple shifting of the guide sleeve. On the other hand, if in any position of the gripper arms pressure is exerted on the pressure plate, to which one end of the gripper arms is pivoted, for instance during the stripping step, the guide levers will act automatically like a friction ratchet gear, so that a slipping of the guide sleeve is avoided with certainty and the gripper arms are prevented from spreading or closing further. In this manner an absolutely reliable operation of the device is guaranteed in a simple manner. In order to increase the arresting effect, I prefer arranging separate clamping jaws at the points, where the guide levers are connected with these central guiding means.

The braking gear itself may either be designed after the manner of a simple screw press or like a cylinder press actuated by displacing a screw. In the latter case the pressure cylinder at the same time serves to guide the displacing and arresting levers of the gripper arms.

In the drawings affixed to this specification and forming part thereof, a stripping device belonging to the kind last mentioned is illustrated diagrammatically by way of example.

In the drawings:

Fig. 1 is a plan view of the device, the pressure plate being partly shown in section, and for the sake of simplicity the two gripper arms being shown as being disposed in the same plane.

Fig. 2 is an end view, viewed from the operating spindle,

Fig. 3 is a cross section on the line A—A in Fig. 1, and

Figure 4:
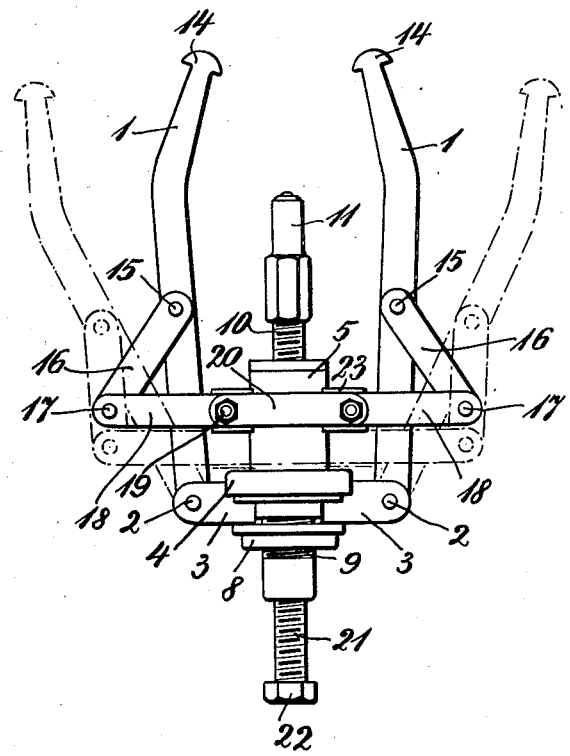
Fig. 4 is a diagrammatic showing of the device illustrating two different positions of the grippers.

Referring to the drawings, 1 are the gripper arms and 2 are the bolts pivoting same to the pressure plate 3, which is arranged behind an annular disk 4 of the stripping press 5 proper. An annular extension of the disk 4 projects into an annular notch 7 of the pressure plate 3, which is held in position by a nut 8, which can be shifted by screwing along the outer threading 9 of the press.

The press proper is designed in a well known manner as an hydraulic press acting in several steps. The piston rod 10 is formed with outer threading, on which a bolt 11 can be displaced by screwing. By shifting this bolt the effective length of the piston rod can be changed. The point of the bolt projects into the centre boring of the shaft 12, on which the part to be stripped (sheave 13) is mounted.

The gripper arms 1 grip the sheave by means of their hook-shaped ends 14. They are connected by bolts 15 to links 16 pivoted by means of bolts 17 to levers 18, which are linked by means of screws 19 to guide segments 20, which are interconnected by the same screws to form a rigid guide sleeve axially displaceable along the cylindrical guide surface of the press 5. By shifting the sleeve in one or the other direction the ends of the gripper arms are moved towards or away from each other, thereby enabling the device to be adjusted for widely different diameters of the part to be stripped.

The stripping of the sheave 13 from its shaft is effected by exerting, by means of the spindle 21, which is turned by means of a wrench mounted on the head 22, a direct or hydraulic pressure on the bolt 11, whereby a pull is exerted in the opposite direction on the pressure plate 3, which is taken up by the disk 4 and is transmitted onto the press casing 5.

The tendency of the gripper arms 1 to spread and thereby to release the sheave 13, will cause, by way of the links 16, the levers 18 to carry out a corresponding rotary movement about the bolts 19, which movement is however kept within very small limits, since it causes the gripper jaws 23 associated with the levers 18 to exert a braking pressure on the guide surface of the press casing 5.

A similar effect arises also in the case if the gripper arms 1 grip the part to be stripped not from the outside, but from the inside, for in this case also any tendency of the gripper arms 1 to close down upon each other again leads to a pressing movement of the jaws 23.

Fig. 4 illustrates by way of example two different positions of the gripper arms. As here shown the levers 18 practically always remain parallel in the centre position, which allows the braking jaws 23 to slide relative to the press casing until the pressure exerted by the press brings about a frictional braking movement, while the levers 18 carry out a slight oscillatory movement in one or the other direction.

The hydraulic press 5 here shown may also be replaced by an ordinary screw press and in that case the clamping jaws 23 will be guided along the screw press casing.

The friction ratchet gear here shown may also be replaced by some other suitable device. Thus for instance the axial guide member, such as the outer surface of the cylinder 5, may be acted upon by a sleeve in three parts, each of which forms a clamping jaw and which are connected with each other by means of screw bolts, to which are linked levers 18 in such manner that any oscillatory movement of the levers 18 causes the screws or their nuts to turn and the clamping jaws to be contracted and pressed against the guide piece or alternatively the jaws to be removed from each other and the guide surface to be released.

I wish it to be understood that I do not desire to be limited to the exact details of construction shown and described for obvious modifications will occur to a person skilled in the art.

I claim:—

A device for stripping sheaves, ballbearings, fly-wheels and the like from the shafts on which they are mounted, comprising an axially displaceable pressure plate, gripper arms pivoted to said plate, a guide sleeve, a guide member for axially guiding said sleeve and clamping means associated with said sleeve and operatively connected with said gripper arms.

ALBERT SCHREM.